United States Patent
Isicovich et al.

(10) Patent No.: US 8,757,011 B2
(45) Date of Patent: Jun. 24, 2014

(54) FLOW METER APPARATUS INCLUDING TWO POLARIZED MAGNETS IN OPPOSITE DIRECTION AND MAGNETIC FIELD SENSORS TO SENSE DIRECTION AND INTENSITY OF MAGNETIC FIELD

(75) Inventors: Shlomo Isicovich, Ramla (IL); Erez Ben-Enosh, Rehovot (IL)

(73) Assignee: M.T.R. Wireless Communications Ltd., Rehovot (IL)

( * ) Notice: Subject to any disclaimer, the term of this patent is extended or adjusted under 35 U.S.C. 154(b) by 0 days.

(21) Appl. No.: 13/993,902

(22) PCT Filed: Jan. 24, 2011

(86) PCT No.: PCT/IB2011/050301
§ 371 (c)(1),
(2), (4) Date: Jun. 13, 2013

(87) PCT Pub. No.: WO2012/101479
PCT Pub. Date: Aug. 2, 2012

(65) Prior Publication Data
US 2013/0263675 A1    Oct. 10, 2013

(51) Int. Cl.
*G01F 1/115*    (2006.01)
*G01F 1/07*    (2006.01)

(52) U.S. Cl.
USPC ..................... 73/861.94; 73/861.88

(58) Field of Classification Search
None
See application file for complete search history.

(56) References Cited

U.S. PATENT DOCUMENTS

| | | | |
|---|---|---|---|
| 6,604,434 B1 * | 8/2003 | Hamilton et al. | 73/861.75 |
| 6,681,645 B1 * | 1/2004 | Feller | 73/861.71 |
| 2002/0050175 A1 * | 5/2002 | Feller | 73/861.12 |
| 2003/0028333 A1 | 2/2003 | Olson | |
| 2005/0120806 A1 | 6/2005 | Vanderah et al. | |
| 2006/0162467 A1 | 7/2006 | Winter | |
| 2006/0181425 A1 | 8/2006 | Crane et al. | |
| 2007/0044574 A1 | 3/2007 | Kawamoto et al. | |
| 2008/0202255 A1 | 8/2008 | Albrecht et al. | |
| 2009/0107253 A1 | 4/2009 | Armas et al. | |

OTHER PUBLICATIONS

International Preliminary Report on Patentability (IPER / IPRP) issued by IPEA/US on International Patent Application No. PCT/IB2011/050301, on Apr. 22, 2013.
International Search Report and Written Opinion dated Jul. 13, 2011, issued on international application No. PCT/IB2011/050301.

* cited by examiner

*Primary Examiner* — Harshad R Patel
(74) *Attorney, Agent, or Firm* — Michael A. Whittaker; Acuity Law Group, P.C.

(57) ABSTRACT

A flow meter apparatus comprising: at least two magnets polarized in substantially opposite directions, mechanically coupled to a mechanical element mounted in a flow conduit and movable by a substance flowing through the flow conduit, for imparting movement from the mechanical element to the magnets, and at least two magnetic field sensors, each of the sensors deployed in a respective position next to the magnets, configured to sense a direction of a magnetic field in the position and to generate a signal indicative of the direction.

20 Claims, 12 Drawing Sheets

FLOW METER APPARATUS INCLUDING TWO POLARIZED MAGNETS IN OPPOSITE DIRECTION AND MAGNETIC FIELD SENSORS TO SENSE DIRECTION AND INTENSITY OF MAGNETIC FIELD

FIELD AND BACKGROUND OF THE INVENTION

The present invention relates to the measurement of gas or liquid flow, and more particularly, but not exclusively, to a flow meter apparatus, for measurement of substance (say gas or liquid) flow through a conduit.

The measurement of liquid or gas flow under pressure in enclosed pipes has historically been performed through the use of mechanical flow meters.

Typically, in the mechanical flow meters, a first mechanism has moving parts which move upon interaction with a gas or a fluid flowing through a pipe, and the movement of the parts is mechanically transmitted to moving parts of a second mechanism used to register the amount of water or gas flowing through the pipe.

For example, piston meters, also known as rotary piston or semi-positive displacement meters, operate on the principle of a piston rotating within a chamber of known volume. For each rotation, an amount of water passes through the piston chamber. As the piston rotates, a needle dial and an odometer type display are advanced.

A turbine flow meter translates the mechanical action of the turbine rotating in a liquid flow around an axis into a user-readable rate of flow.

The turbine's wheel is set in the path of a fluid stream. The flowing fluid impinges the wheel's blades, imparting a force to the blades surfaces and setting the wheel in motion. When a steady rotation speed is reached, the rotation speed is proportional to fluid velocity.

Turbine flow meters are used for the measurement of both gas and liquid flow.

With turbine meters, the flow direction is generally straight through the meter, allowing for higher flow rates and less pressure loss than displacement-type meters.

Turbine meters have become the meters of choice for large commercial users, fire protection, and as master meters for water distribution systems.

A woltmann meter comprises a rotor with helical blades inserted axially in the flow, much like a ducted fan. Woltmann meters may be considered a type of turbine flow meter. Woltmann meters are commonly referred to as helix meters, and are popular at larger sizes.

A nutating disk meter is probably the most commonly used meter for measuring water supply.

With a nutating disk meter, the substance, most commonly water, enters in one side of the meter and strikes a nutating disk, which is eccentrically mounted. The disk must then nutate about the vertical axis, since the bottom and the top of the disk remain in contact with a mounting chamber. A partition separates the inlet and outlet chambers. As the disk nutates, it gives direct indication of the volume of the liquid that has passed through the meter as volumetric flow is indicated by a gearing and register arrangement, which is connected to the disk.

Some mechanical flow meters are rather pressure-based.

Pressure-based flow meters typically rely on Bernoulli's principle, either by measuring the differential pressure within a constriction, or by measuring static and stagnation pressures to derive the dynamic pressure.

For example, a Venturi meter constricts the flow in some fashion, and pressure sensors measure the differential pressure before and within the constriction. This method is widely used to measure flow rate in the transmission of gas through pipelines, and has been used since Roman Empire times.

Optical flow meters use light to determine flow rate.

In one example, small particles which accompany natural and industrial gases pass through two laser beams focused in a pipe by illuminating optics. Laser light is scattered when a particle crosses the first beam. The detecting optics collects scattered light on a photo detector, which then generates a pulse signal. If the same particle crosses the second beam, the detecting optics collect scattered light on a second photo detector, which converts the incoming light into a second electrical pulse. By measuring the time interval between the two pulses, the gas velocity may be calculated.

Another currently used flow meter is a magnetic flow meter in which a magnetic field is applied to a metering tube, which results in a potential difference proportional to the flow velocity perpendicular to the flux lines. The physical principle at work is Faraday's law of electromagnetic induction. The magnetic flow meter requires a conducting fluid, e.g. water, and an electrical insulating pipe surface, e.g. a rubber lined nonmagnetic steel tube.

Ultrasonic flow meters measure the difference of transit time of ultrasonic pulses propagating in and against flow direction. This time difference is a measure for the average velocity of the fluid along the path of the ultrasonic beam. By using the absolute transit times both the averaged fluid velocity and the speed of sound can be calculated, as known in the art.

SUMMARY OF THE INVENTION

According to one aspect of the present invention, there is provided a flow meter apparatus comprising: at least two magnets polarized in substantially opposite directions, mechanically coupled to a mechanical element mounted in a flow conduit and movable by a substance flowing through the flow conduit, for imparting movement from the mechanical element to the magnets, and at least two magnetic field sensors, each of the sensors deployed in a respective position next to the magnets, configured to sense a direction of a magnetic field in the position and to generate a signal indicative of the direction.

Optionally, the flow meter apparatus further comprises a processor, in communication with the magnetic field sensors, configured to calculate a parameter characterizing the flowing of the substance through the conduit, using changes in the generated signals indicative of the directions.

According to a second aspect of the present invention, there is provided a method for flow metering, comprising the steps of: a) installing at least two magnets polarized in substantially opposite directions, mechanically coupled to a mechanical element mounted in a flow conduit and movable by a substance flowing through the flow conduit, for imparting movement from the mechanical element to the magnets, b) deploying at least two magnetic field sensors, each sensor being deployed in a respective position next to the magnets, and c) sensing a direction of a magnetic field in each of the positions, using the sensor deployed in the position.

Optionally, the method further comprises a step of calculating a parameter characterizing the flowing of the substance through the conduit, using changes in the sensed directions.

According to a third aspect of the present invention, there is provided a flow meter kit comprising: a processor, configured to communicate with at least two magnetic field sensors and calculate a parameter characterizing flowing of a substance through a flow conduit, using changes in a signal generated by each respective one of the sensors, the signal being indicative of a direction of a magnetic field in position of the sensor, the magnetic field being produced by at least two magnets polarized in substantially opposite directions and mechanically coupled to a mechanical element mounted in the flow conduit and movable by the substance flowing through the flow conduit, for imparting movement from the mechanical element to the magnets.

Optionally, the kit further comprises the magnets, for mechanical coupling to the mechanical element, with polarity in substantially opposite directions.

Optionally, the kit further comprises the sensors, for deployment in the positions, in a predefined spatial relation to the magnets.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof.

Moreover, according to actual instrumentation and equipment of preferred embodiments of the method and system of the present invention, several selected steps could be implemented by hardware or by software on any operating system of any firmware or a combination thereof.

For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. The description taken with the drawings making apparent to those skilled in the art how the several forms of the invention may be embodied in practice.

In the drawings.

DESCRIPTION OF THE PREFERRED EMBODIMENTS

Figure 1:
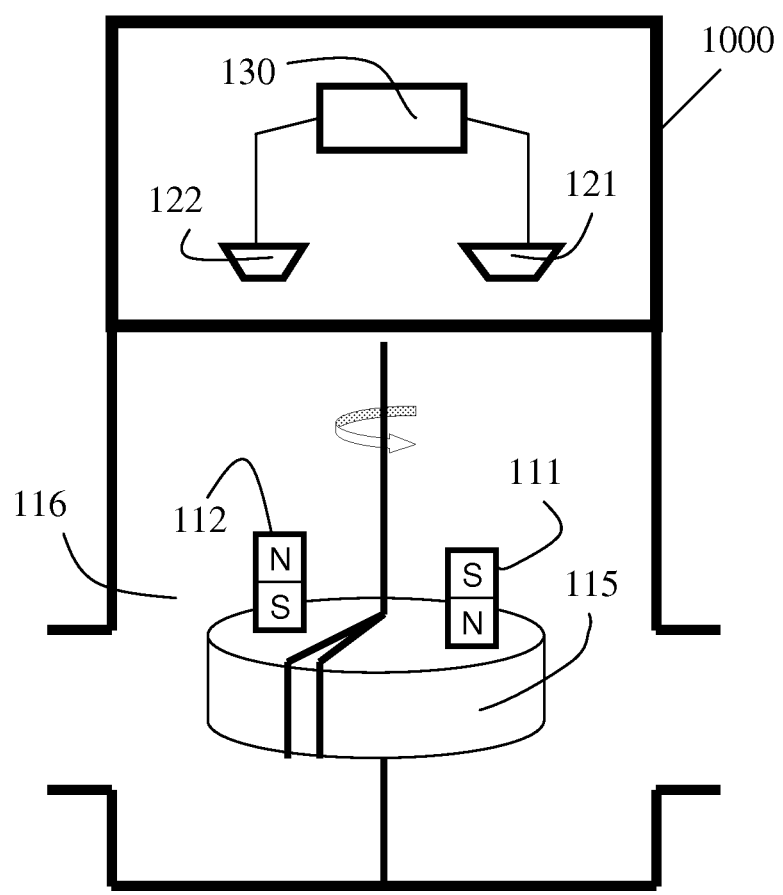
FIG. 1 is a block diagram schematically illustrating a first flow meter apparatus, according to an exemplary embodiment of the present invention.

The present embodiments comprise a flow meter apparatus, a method for flow metering, and a flow meter kit.

A flow meter apparatus, according to an exemplary embodiment of the present invention, includes two or more magnets polarized in opposite directions (say one or more magnets with a north pole up and a south pole down, and one or more magnets with a south pole up and a north pole down).

The magnets of opposite polarization are mechanically coupled to a mechanical element mounted in a flow conduit, say a mechanical metering device mounted in a water pipe or in a gas pipe, for imparting movement from the mechanical element to the magnets.

Upon flowing of a substance (say water) through the conduit, the mechanical element moves and imparts the movement to the magnets, say a lateral movement or a rotational movement or, as described in further detail hereinbelow.

The exemplary flow meter apparatus further includes two or more magnetic field sensors deployed in points next to the magnets, say in a compartment positioned about twelve millimeters above a plane in which the magnets move in concert with the mechanical element, as described in further detail hereinbelow.

Each of the sensors senses the direction of a magnetic field in the point in which the sensor is deployed, and generates a signal indicative of the direction.

The strength and direction of a magnetic field in each of the points depend on the instant positions of the two (or more) magnets, and varies as the magnets move in concert with the mechanical element (say rotate or move latterly).

Consequently, a parameter which characterizes the flow of substance through the pipe may be calculated, according to changes in the signals generated by the sensors, as described in further detail hereinbelow.

The parameter may include but is not limited to velocity, volume (or consumption), etc. The parameter may be used utilized for displaying incremental tallying and reckoning data, as described in further detail hereinbelow.

The principles and operation of an apparatus according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings.

The invention is capable of other embodiments or of being practiced or carried out in various ways. Also, it is to be understood that the phraseology and terminology employed herein is for the purpose of description and should not be regarded as limiting.

Reference is now made to FIG. 1, which is a block diagram schematically illustrating a first flow meter apparatus, according to an exemplary embodiment of the present invention.

A flow meter apparatus 1000 according to an exemplary embodiment of the present invention, includes two or more magnets 111, 112, say permanent magnets such as corrosion protected magnets of grade N45, electromagnets, etc. as known in the art.

The magnets 111, 112 are polarized in opposite (or nearly opposite) directions, say one magnet 111 with a south pole up and a north pole down and one magnet 112 with a north pole up and a south pole down.

Optionally, the magnets 111, 112 comprise one or more paired sets (i.e. 2, 4, etc.) of magnets arranged in alternating polarization directions, to form a linear array, a tubular array such as a ring, etc., as described in further detail hereinbelow.

The magnets 111, 112 are mechanically coupled to a mechanical element 115 mounted in a flow conduit 116 (say a compartment of the apparatus 1000, through which the substance flows), as described in further detail hereinbelow.

For example, the magnets 111, 112 may be affixed to the mechanical element using glue, fasteners (say screws), etc., as described in further detail hereinbelow.

The mechanical element 115 is moved by a substance, as the substance flows through the flow conduit 116, as known in the art.

The movement of the mechanical element may be, but is not limited to: a rotational movement, a lateral movement, an irregular movement, etc., as known in the art.

The mechanical coupling of the magnets 111, 112 to the mechanical element 115, allows impartment of the movement of the element 115 from the element 115 to the magnets 111, 112.

In one example, and similarly to elements of many currently used mechanical metering devices, the mechanical element 115 is a rotational element such as a wheel connected to a rotatable shaft, say a rotor with rotor vanes extending radially at an angle of inclination with the rotor's axis (i.e. with the rotatable shaft).

The mechanical element 115 is set in path of a material (say a fluid or a gas) which flows through the flow conduit 116.

As the material flows through the conduit 116, the material impinges on the vanes and imparts a force to the vanes' surfaces, thus setting the rotor in rotational motion, as known in the art. Consequently, the magnets 111, 112 mechanically coupled to the mechanical element 115, rotate with the wheel 115.

The mechanical element 115 may also have any of other known in the art forms, usable for generation of movement by a material which flows through a flow conduit, as currently used for mechanically measuring flow, such as turbines of various designs, Woltmann meters, pressure-based meters, etc.

The apparatus 1000 further includes two or more magnetic field sensors 121, 122.

Each of the sensors is deployed in a respective position next to the magnets 111, 112, say in a distance of 1 to 20 millimeter from the magnets 111, 112. The sensor senses a direction of a magnetic field in the position, and generates a signal indicative of the direction.

Optionally, the magnets 111, 112 are mounted on the mechanical element 115 (say the rotor of the example provided hereinabove) and rotate simultaneously with the mechanical element 115. Consequently, the direction of the magnetic field sensed by each of the sensors 121, 122, which depends on each sensor's position relative to each of the magnets 111, 112, alternates in concert with rotation of the magnets 111, 112, as described in further detail hereinbelow.

Optionally, the flow meter apparatus 1000 further includes a processor 130, in communication with the magnetic field sensors 121, 122.

Optionally, the processor 130 communicates with the sensors 121, 122 through a printed circuit, as known in the art.

Optionally, the processor 130 is embedded in an electric circuit (say on a digital processing board as known in the art).

The processor 130 calculates a parameter which characterizes the flowing of the substance through the conduit 116, using changes in the signals generated by the sensors 121, 122.

The signals generated by the sensors 121, 122 are indicative of the directions of the magnetic fields.

Consequently, the changes in the signals are indicative of changes in the directions of the magnetic fields, as described in further detail hereinbelow.

The calculated parameter may include, but is not limited to: velocity of flowing of the substance through the conduit 116, volume of substance which flows through the conduit 116, direction of flow of the substance through the conduit 116, etc.

Optionally, the processor 130 controls the sensors 121, 122, by dynamically adjusting a frequency rate in which each of the sensors 121, 122 samples the direction and strength of magnetic field in the sensor's position, and re-generates (i.e. updates) the signal.

In one example, every two seconds, the processor 130 instructs the sensors 121, 122 to sample the magnetic field. When the velocity of substance flow increases, the processor 130 increases the frequency in which the processor 130 instructs the sensors to sample the magnetic field.

By adjusting the frequency of the sampling, the processor 130 may save electric power consumption by the sensors 121, 122, and extend the sensors' life expectancy, as described in further detail hereinbelow.

Optionally, each of the magnetic field sensors 121, 122, generates a first signal when the magnetic field is a magnetic field of a first direction, with an intensity which is greater than a first threshold. The sensor's signal remains the same (i.e. the generated first signal), until the magnetic field turns into a magnetic field of an opposite direction, with an intensity which is greater than a second threshold, as described in further detail hereinbelow.

In one example, each of the sensors 121, 122, is a Hall-effect digital latch connected to the processor 130 through a channel of an electric circuit board on which the processor 130 is implemented.

The latch switches on only when the latch senses a south magnetic field of an intensity greater than a first threshold (as predefined by the latch vendor), in which case, the latch transmits a positive signal (say a '1' bit) to the processor 130.

In the example, the switched on Hall-effect digital latch switches off only when the magnetic field turns into a north magnetic field of an intensity greater than a second threshold (as predefined by the latch vendor), as described in further detail hereinbelow. That is to say that once turned on, the latch remains turned on and the signal remains positive, until the latch senses a north magnetic field of intensity greater than the second threshold.

When the latch switches off, the latch transmits a negative signal (say a '0' bit) to the processor 130, as described in further detail hereinbelow.

The processor 130 uses the changes (also referred to hereinbelow as interrupts) in the signals, to calculate the parameter which characterizes the flow, as described in further detail hereinbelow.

The two thresholds may be the same (only with a magnetic field in opposite direction), as described in further detail hereinbelow.

A carefully selected distribution of the sensors may provide for flow measurement in an accurate and energy efficient manner.

Optionally, the sensors are distributed in an asymmetric manner, over a circle in which the magnets 111, 112 rotate, as described in further detail for the examples provided hereinbelow.

In a first example, the magnets 111, 112 rotate in a circle, in a plane below the magnetic field sensors 121, 122.

In the first example, the magnetic field include 121,122 two sensors, and each of the sensors 121, 122 is deployed in a respective position over a point in the circle's circumference. The points form an angle of about ninety degrees with an axis of the magnets' rotation, as described in further detail hereinbelow.

As the magnets 111, 112 rotate below the sensors 121, 122, the magnetic field sensed by each of the sensors 121, 122 alternates between different magnetic polarity directions, as described in further detail hereinbelow.

In a second example, the magnets 111, 112 also rotate in a circle in a plane below the magnetic field sensors.

However, in the second example, the magnetic field sensors comprise three sensors, and each of the sensors 121, 122 is deployed in a respective position over a point in the circle's circumference. Each two adjacent ones of the points form an angle of about sixty degrees with an axis of rotation of the magnets 111, 112, as described in further detail hereinbelow.

Optionally, the processor 130, as well the magnets 111, 112 and the sensors 121, 122 may be removed from the apparatus 1000, for repair, routine maintenance, replacement, etc.

Optionally, the flow meter apparatus 1000 further includes a power source (not shown), such as a small battery, which provides power to the sensors 121, 122 and the processor 130, as known in the art.

Optionally, the flow meter apparatus 1000 further includes a display, say a small Liquid Crystal Display (LCD), connected to the processor 130.

The processor 130 may present the calculated or incremental tallying and reckoning data based on the parameter on the display, as known in the art.

The processor 130 may recalculate the parameters on a periodic basis, say every few seconds or each time one of the sensor's signal changes, and present the recalculated parameter on the display.

Optionally, the apparatus 1000 further includes a modem (say a radio frequency modem or an internet modem). The processor 130 uses the modem, for communicating the calculated parameter to a remote party, say to a computer in remote communication with the apparatus 1000.

Figure 2:
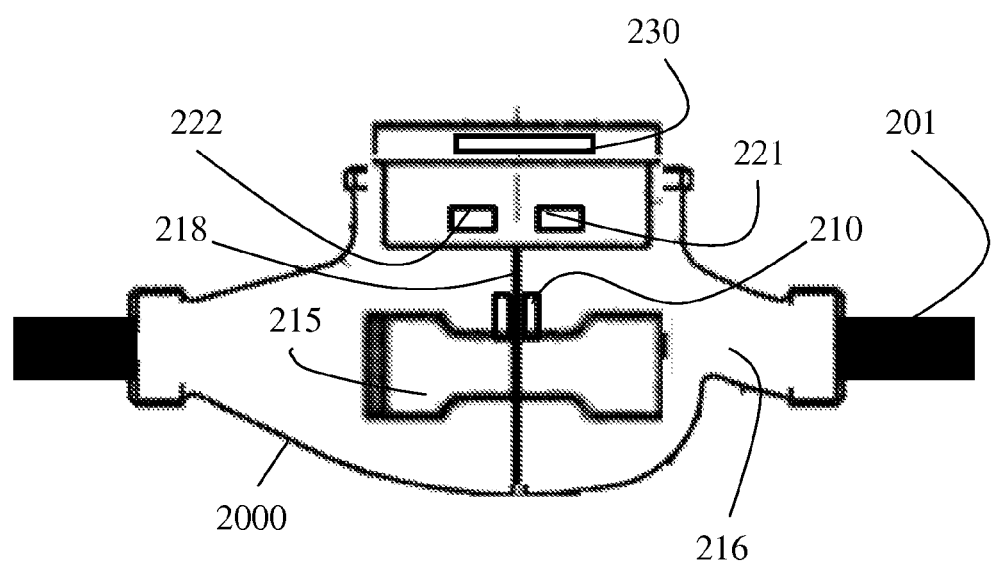
FIG. 2 is a block diagram schematically illustrating a second flow meter apparatus, according to an exemplary embodiment of the present invention.

Reference is now made to FIG. 2, which is a block diagram schematically illustrating a second flow meter apparatus, according to an exemplary embodiment of the present invention.

An exemplary flow meter apparatus 2000 is used as a flow meter for measuring liquid flow through a pipeline 201.

The apparatus 2000 is installed in the pipeline 201, say in a pipe which supplies water to an apartment, in a gas pipeline, etc.

The flow meter apparatus 2000 includes two magnets 210.

The magnets 210 are polarized in substantially opposite directions, say one magnet with a north pole up and a south pole down and one magnet with a south pole up and a north pole down.

More specifically, the magnets 210 are installed in a flow conduit 216 which forms a lower part of the apparatus 2000, in mechanical coupling to a wheel 215 (say a rotor). One magnet is installed with a north pole up and another magnet is installed with a south pole up.

The magnets 210 are mounted on a rotational shaft 218 connected to the wheel 215. The magnets 210 rotate simultaneously with the wheel 215 and the shaft 218, as the fluid or gas flows through the flow conduit 216 of the apparatus 2000 and sets the wheel 215 in rotational movement, as described in further detail hereinabove.

The apparatus 2000 further includes two magnetic field sensors 221, 222.

Each of the sensors is deployed in a respective position next to the magnets 210, say in a position 1 to 20 millimeter above the magnets 210. The sensor senses a direction of a magnetic field in the position, and generates a signal indicative of the direction.

As the magnets 210 rotate simultaneously with the wheel 215 and the shaft 218, the direction of the magnetic field sensed by each of the sensors 221, 222, which depends on each sensor's position relative to each of the magnets 210, alternates in concert with the rotation of the magnets 210, as described in further detail hereinbelow.

The flow meter apparatus 2000 further includes a processor 230, say a processor 230 implemented on an electric circuit, as described in further detail hereinabove.

The processor 230 communicates with the sensors 221, 222, for receiving the signals generated by sensors 221, 222, and calculates a parameter which characterizes the flowing of the fluid through the conduit 216, using changes in the signal generated by the first sensor 221 and changes in the signal generated by the second sensor 222.

The signals generated by the sensors 221, 222 are indicative of the directions of the magnetic field in each sensor's position. Consequently, the changes in the signals are indicative of changes in direction of the magnetic fields in the position, which occur as the wheel 215 rotates and the magnets 210 rotate with the wheel 215.

That is to say that the changes in the signal reflect the rotational movement of the wheel 315, and are thus useful for calculating the parameter characterizing the flow of the fluid through the conduit, as described in further detail hereinbelow.

The calculated parameter may include, but is not limited to: velocity of flowing of the substance through the conduit, volume of the substance which flows through the conduit, direction of flow of the substance through the conduit, etc.

Figure 3A:
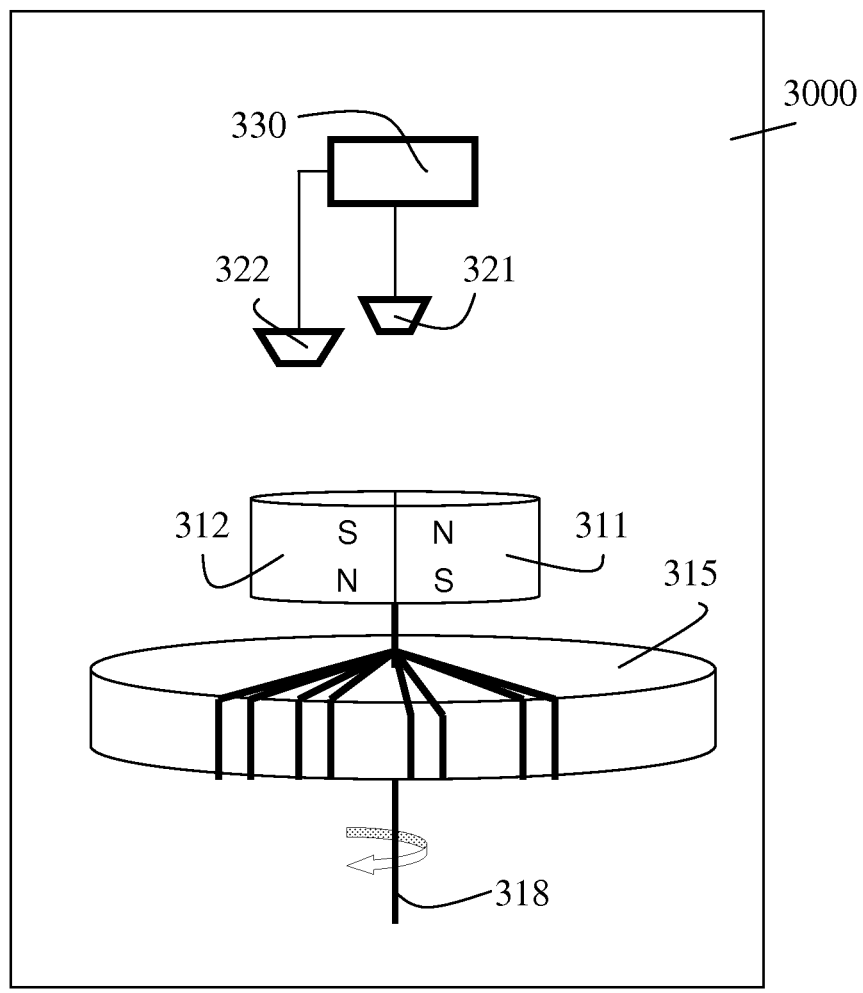
FIG. 3A is a block diagram schematically illustrating a third flow meter apparatus, according to an exemplary embodiment of the present invention.

Reference is now made to FIG. 3A, which is a block diagram schematically illustrating a third flow meter apparatus, according to an exemplary embodiment of the present invention.

An exemplary flow meter apparatus 3000 includes two magnets 311, 312 which from a ring. Each magnet is shaped as a half of the ring, as described in further detail and illustrated using FIGS. 5A and 5B hereinbelow.

The two magnets 311, 312 are similar in magnetic field strength and dimensions.

However, the two magnets 311, 312 are polarized in substantially opposite directions. More specifically, one magnet 311 is installed with a north pole up and a south pole down, and one magnet 312 is installed with a south pole up and a north pole down.

The magnets 311, 312 are mechanically coupled to a mechanical element 315 mounted in a flow conduit. The mechanical element 315 is movable by a substance flowing through the flow conduit, say water or gas, as known in the art.

The mechanical coupling of the magnets 311, 312 to the element 315 allows impartment of the movement from the mechanical element 315 to the magnets 311, 312, as described in further detail hereinabove.

Optionally, the mechanical element 315 is a rotational element such as a wheel connected to a rotatable shaft 318, as described in further detail hereinabove.

The mechanical element 315 is set in path of the substance which flows through the flow conduit. As the substance flows through the conduit, the wheel is set in rotational motion, as described in further detail hereinabove.

Consequently, the magnets 311, 312 mechanically coupled to the mechanical element 315 (i.e. the wheel), rotate with the wheel 315.

The apparatus 1000 further includes two magnetic field sensors 321, 322.

Each of the sensors 321, 322 is deployed in a respective position over a point in circumference of the circle on which the magnets 311, 312 rotate. The points form an angle of about ninety degrees with an axis (i.e. with the shaft 318) of the magnets' rotation, as described in further detail hereinbelow.

The sensor senses a direction of a magnetic field in the position, and generates a signal indicative of the direction.

The direction of the magnetic field sensed by each of the sensors 321, 322, depends on each sensor's position in relation to each of the magnets 311, 312.

As the substance flows through the conduit, the magnets 311, 312 rotate with the wheel 315, and the direction of the magnetic field sensed by each of the sensors 321, 322, alternates in concert with the rotation of the magnets 311, 312, as described in further detail hereinbelow.

Figure 3B:
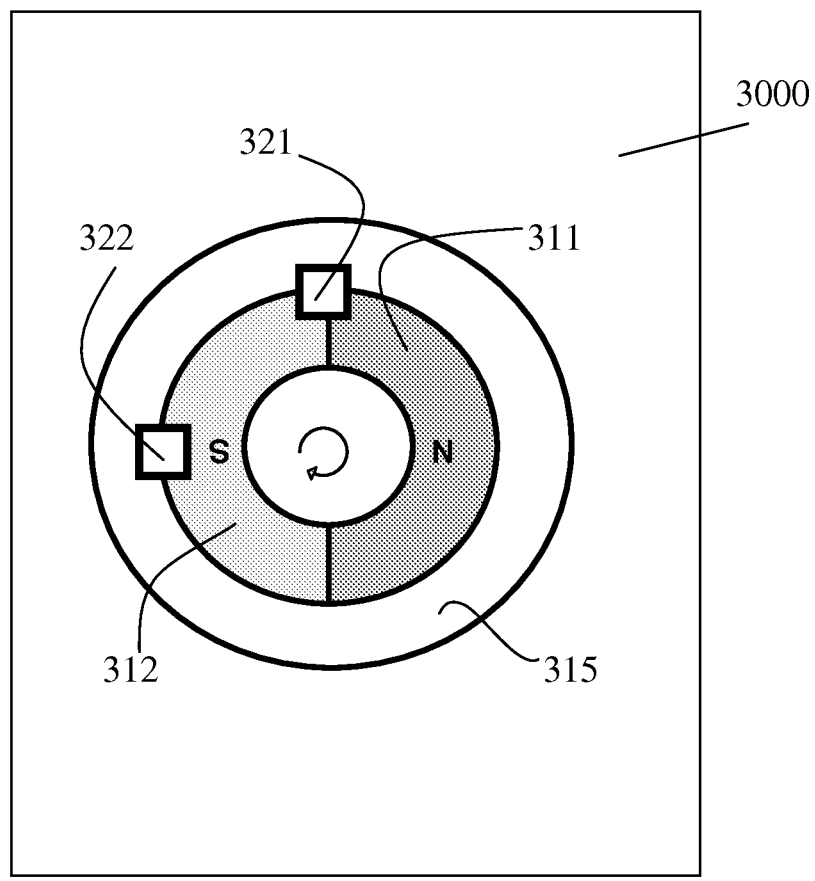
FIG. 3B is a first block diagram schematically illustrating the third flow meter apparatus, according to an exemplary embodiment of the present invention, from a top view.

Reference is now made to FIG. 3B, which is a block diagram schematically illustrating the third flow meter apparatus 3000, from a top view.

As schematically illustrated using FIG. 3B, each of the sensors 321, 322 is deployed in a respective position over a point in circumference of the circle, on which the magnets 311, 312 rotate. The points form an angle of about ninety degrees with an axis of the magnets' rotation, as described in further detail hereinbelow.

As the magnets 311, 312 rotate below the sensors 321, 322, the magnetic field sensed by each of the sensors 321, 322 alternates between different magnetic polarity directions.

For example, when the rotation of the magnets brings the magnets 311, 312 into the positions in FIG. 3B, a first sensor 321 senses a magnetic field which lacks a strong enough direction. The magnetic field lacks a strong enough direction because the sensor 321 is in a position over a midpoint between the two magnets 311, 312. In the position, the magnetic field of the magnet 311 with a north pole up significantly offsets the magnetic field of the magnet 312 with a south pole up, thus preventing a strong enough magnetic field in both polarization directions.

By contrast, the second sensor 322 is in a position over the magnet 312 with a south pole up. Consequently, the second sensor 322 senses a magnetic field which has a strong intensity in one direction, namely the south.

As the magnets 311, 312 rotate, the magnetic field sensed by each of the sensors 321, 322 alternates between different magnetic polarity directions, with a ninety degrees phase difference between the sensors 321, 322, as described in further detail hereinbelow.

Referring back to FIG. 3A, the flow meter apparatus 3000 further includes a processor 330, in communication with the magnetic field sensors 321, 322.

Optionally, the processor 330 is embedded in an electric circuit, on a digital processing board, as described in further detail hereinabove.

The processor 330 calculates a parameter which characterizes the flowing of the substance through the conduit, using changes in the signals generated by the sensors 321, 322, as described in further detail hereinbelow.

The signals generated by the sensors 321, 322 are indicative of the directions of the magnetic fields. Consequently, the changes in the signals are indicative of changes in direction of the magnetic fields in the positions in which the sensors 321, 322 are deployed, as described in further detail hereinbelow.

As the magnets 311, 312 rotate, the magnetic field sensed by each of the sensors 321, 322 alternates between different magnetic polarity directions, with a ninety degrees phase difference between the sensors 321, 322, as described in further detail hereinbelow.

Consequently, the processor 330 processes the signals generated by the sensors 321, 322, to calculate a parameter which characterizes the flow of the substance through the conduit.

The calculated parameter may include, but is not limited to: velocity of flowing of the substance through the conduit, volume of the substance which flows through the conduit, direction of flow of the substance through the conduit, etc.

Optionally, each of the two magnetic field sensors 321, 322, generates a first signal when the magnetic field is a magnetic field of a first direction, with an intensity which is greater than a first threshold. The sensor's signal remains the same (i.e. the generated first signal), until the magnetic field turns into a magnetic field of an opposite direction, with an intensity greater than a second threshold, as described in further detail hereinbelow.

In one example, each of the two sensors 321, 322, is a Hall-effect digital latch connected to the processor 330 through a channel of an electric circuit board on which the processor 330 is implemented.

Optionally, each latch samples (i.e. senses) the intensity and direction of the magnetic field in the position in which the latch is deployed, in a periodic basis.

Optionally, the processor 330 controls the sensors 321, 322 (i.e. latches), by dynamically adjusting a frequency rate in which each of the sensors 321, 322 samples the direction and strength of magnetic field in the sensor's position.

In the example, every two seconds, the processor 330 instructs the sensors 321, 322 to sample the magnetic fields. When the velocity of substance flow increases, the processor 330 increases the frequency in which the processor 330 instructs the sensors 321, 322 to sample the magnetic fields.

By adjusting the frequency of the sampling, the processor 330 may save electric power consumption by the sensors 321, 322, and extend the sensors' 321, 322 life expectancy, as described in further detail hereinbelow.

The Hall-effect digital latch switches on only when the latch senses a south magnetic field of an intensity greater than a first threshold (as predefined by the latch vendor), in which case, the channel transmits a positive signal (say a '1' bit) from the latch, to the processor 330.

In the example, the switched on Hall-effect digital latch switches off only when the magnetic field turns into a north magnetic field of an intensity greater than a second threshold (as predefined by the latch vendor). That is to say that once turned on, the latch remains turned on and the signal remains positive, until the latch senses a north magnetic field of intensity greater than the second threshold.

When the latch switches off, the channel which connects the latch to the processor 330 transmits a negative signal (say a '0' bit) from the latch, to the processor 330, as described in further detail hereinbelow.

The two thresholds may be the same (only with a magnetic field in opposite direction), as described in further detail hereinbelow.

In every instant of time of operation of the apparatus 3000, each of the two channels (one channel for each sensor), carries a signal (i.e. a '0' bit or a '1' bit), which depends on the status (switched on or switched off) of the latch connected to the channel.

Optionally, the processor 330 calculates the parameter, using a stack (i.e. a last-in first-out data structure, as known in the art) of signals or another data structure, as known in the art. The stack accumulates the signals transmitted from each of the sensors 321, 322.

Upon a change (also refereed to hereinbelow as an interrupt) in signal of one of the sensors 321, 322 (i.e. latches), the processor 330 samples the two channels which transmit the signals from the sensors 321, 322 to the processor 330, reads the pair of signals from the channels, and pushes the pair of signals read from the channels into the stack.

Every few seconds, or immediately upon the interrupt, the processor 330 processes the signals accumulated in the stack, for calculating the parameter which characterizes the flow of the substance through the conduit, and empties the stack.

Changes in the pairs of signals reflect the changing (i.e. rotating) positions of the magnets 311, 312, and are thus indicative of the flow of the substance through the conduit.

In one example, the pair of signals read (say when the magnets 311, 312 are in the positions illustrated using FIG. 3B) is '01', where the first sensor 321 (say latch) generates the negative signal ('0') and the second sensor 322 (positioned above magnet 312) generates the positive signal ('1').

Figure 3C:
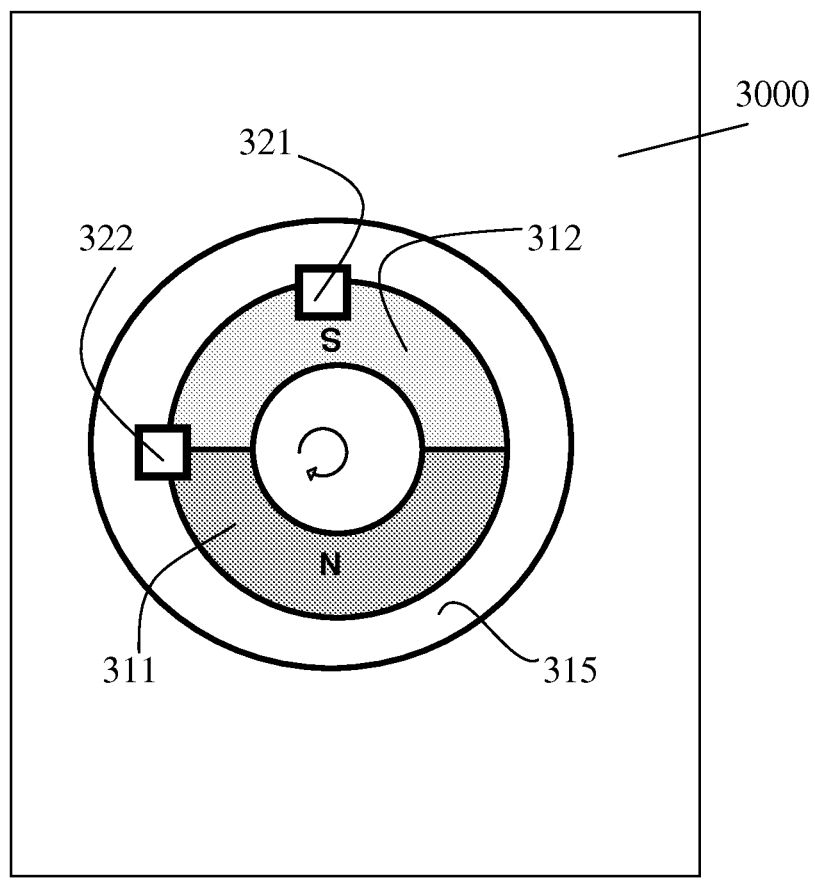
FIG. 3C is a second block diagram schematically illustrating the third flow meter apparatus, according to an exemplary embodiment of the present invention, from a top view.

When the magnets 311, 312 rotate clockwise, along the circle, into a position which is illustrated using FIG. 3C, the pair of signals read is '11', where the first sensor 321 now positioned over magnet 312, generates the positive signal ('1') and the second sensor 322 remains with a positive signal ('1').

Figure 3D:
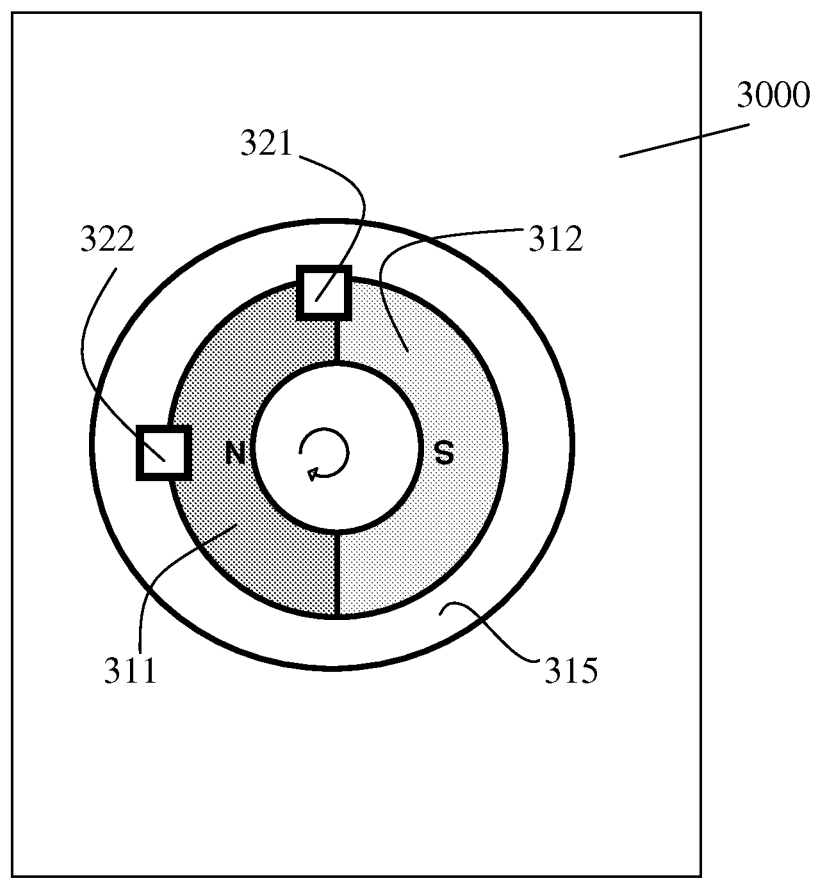
FIG. 3D is a third block diagram schematically illustrating the third flow meter apparatus, according to an exemplary embodiment of the present invention, from a top view.

When the magnets 311, 312 rotate further, clockwise, along the circle, into a position which is illustrated using FIG. 3D, the pair of signals read is '10', where the first sensor 321 keeps the positive signal ('1') and the second sensor 322, now positioned over magnet 311, switches to a negative signal ('0').

Consequently, the processor 330 interprets a signal sequence of '011110' as indicative of a clockwise rotation of the magnets through the stages illustrated using FIG. 3B to 3D (i.e. a 270° clockwise rotation of the wheel 315).

Similarly, the processor 330 interprets a signal sequence of '011101' as indicative of a rotation in opposite direction, through the stages illustrated using FIG. 3D to 3B (i.e. a 270° counterclockwise rotation of the wheel 315).

Taking into consideration interpretation of the sequence of signals, together with calibration data which correlates the velocity of the rotation and volume of substance, the processor 330 calculates the parameter which characterizes the flow of the substance through the conduit (say the flow rate in terms of volume and time).

Optionally, the calibration data is obtained through an initial stage in which the apparatus 3000 is calibrated, as known in the art.

Optionally, the processor 330 further takes into consideration data on a time interval of the rotation indicated by the signal sequence, say from the processor's 330 own clock, for calculating the parameter.

Optionally, the processor 330 further uses a statistical model for filtering out parameter values which deviate from a standard deviation based interval, as known in the art.

Optionally, the processor 330, as well the magnets 311, 312 and the sensors 321, 322 may be removed from the apparatus 3000, for repair, routine maintenance, replacement, etc.

Figure 4A:
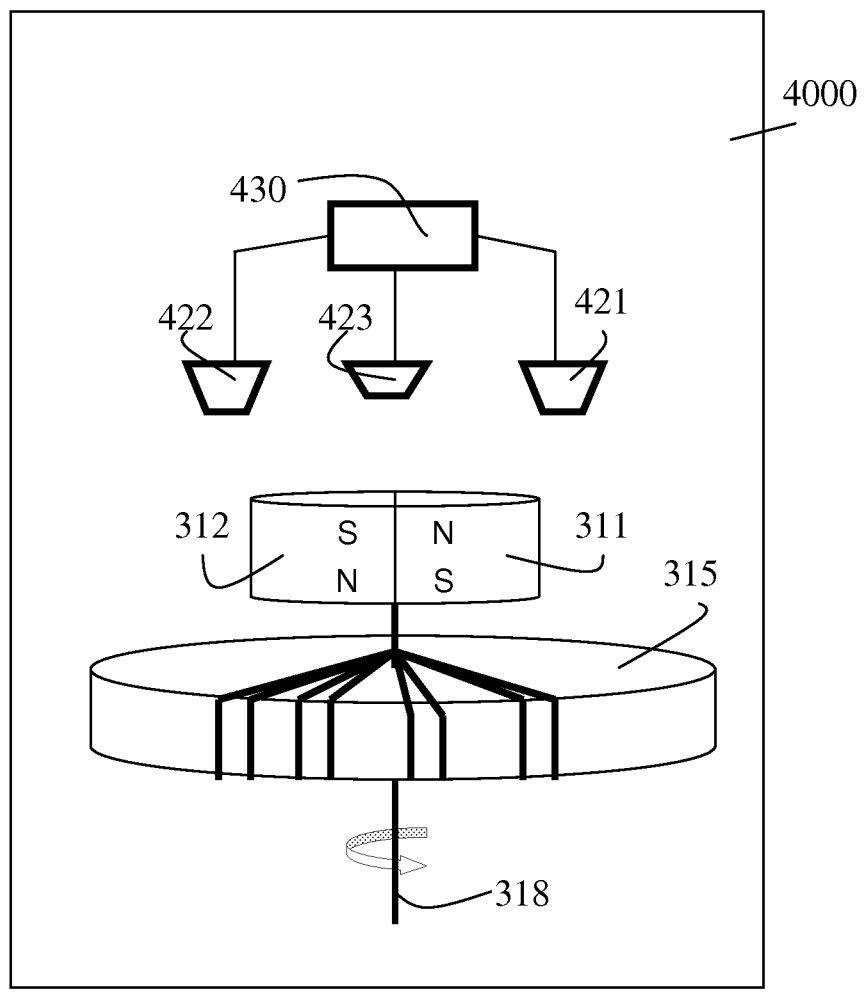
FIG. 4A is a block diagram schematically illustrating a fourth flow meter apparatus, according to an exemplary embodiment of the present invention.

Reference is now made to FIG. 4A, which is a block diagram schematically illustrating a fourth flow meter apparatus, according to an exemplary embodiment of the present invention.

A flow meter apparatus 4000 according to an exemplary embodiment of the present invention includes the two magnets 311, 312 of apparatus 3000, as described in further detail hereinbelow, and illustrated using FIGS. 5A and 5B.

The apparatus 4000 further includes the mechanical element 315, to which the magnets 311, 312 are mechanically coupled, as described in further detail hereinabove. The mechanical element 315 is a rotational element such as a wheel connected to a rotatable shaft 318, as described in further detail hereinabove.

However, the apparatus 4000 includes three magnetic fields sensors 421, 422 and 423, rather than the two sensors of apparatus 3000.

Figure 4B:
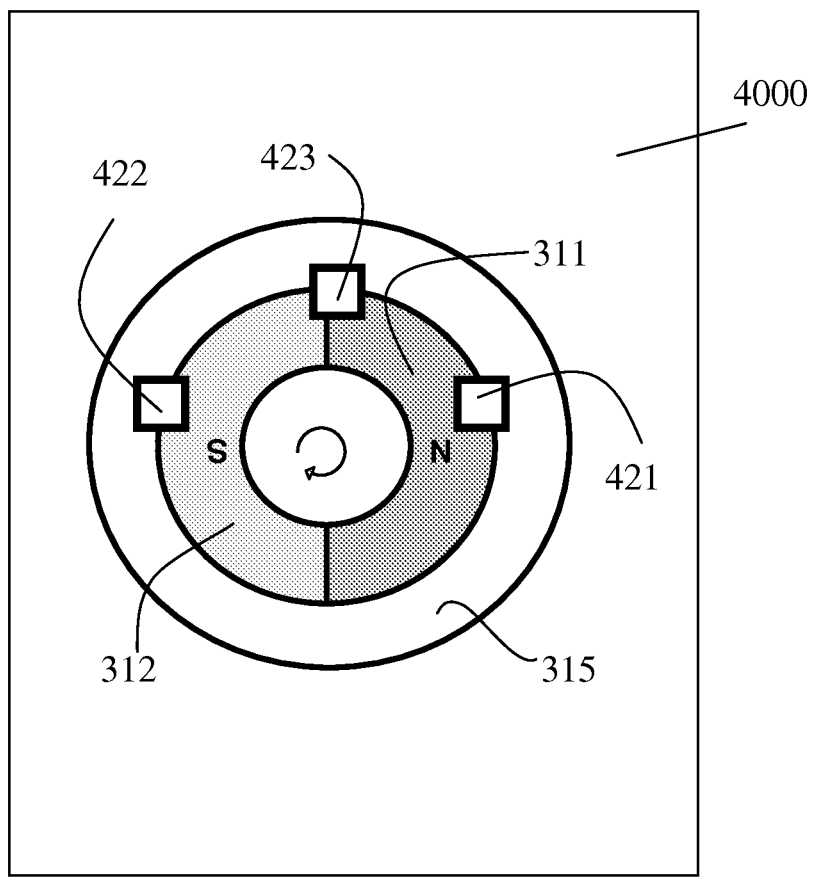
FIG. 4B is block diagram schematically illustrating the fourth flow meter apparatus, according to an exemplary embodiment of the present invention, from a top view.

As schematically illustrated using FIG. 4B, each of the sensors 421-423, is deployed in a respective position over a point in circumference of the circle, on which the magnets 311, 312 rotate. The points form two angles of about sixty degrees with an axis of the magnets' 311, 312 rotation.

As the magnets 311, 312 rotate, the magnetic field sensed by each of the sensors 421-423 alternates between different magnetic polarity directions, with a phase difference between the sensors 421-423, as described in further detail hereinabove.

The apparatus 4000 further includes a processor 430, which processes the signals generated by the sensors 421-423, to calculate a parameter which characterizes the flow of the substance through the conduit, say a velocity or a volume, as described in further detail hereinabove.

Figure 5A:
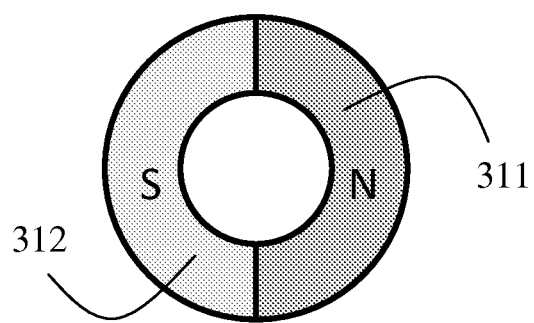
FIG. 5A is a block diagram schematically illustrating an exemplary pair of opposite magnets, in a top view, according to an exemplary embodiment of the present invention.

Reference is now made to FIG. 5A, which is a block diagram schematically illustrating an exemplary pair of opposite magnets, in a top view, according to an exemplary embodiment of the present invention.

A pair of magnets 311, 312 according to an exemplary embodiment of the present invention, includes two halves which form a ring.

The two magnets 311, 312 which form the ring, are polarized in opposite directions, or in nearly opposite directions. More specifically, one half 311 of the ring is a magnet with a north magnetic pole up and a south magnetic pole down, whereas another half 312 of the ring is a magnet with a south magnetic pole up and a north magnetic field down.

When coupled to a mechanical element which rotates about a shaft upon flowing of a substance through a conduit, say when fastened to the shaft's circumference, the magnets 311, 312 rotate with the shaft.

Consequently, magnetic field sensors carefully positioned above a plane in which the mechanical element rotates, sense a magnetic field which alternates as the mechanical element rotates upon flowing of the substance through the conduit, as described in further detail hereinabove.

Further, the two halves 311, 312 (i.e. magnets) are attracted to each other, thus avoiding a need to use fasteners to connect the two halves. Consequently, a manufacturing processing of apparatus 2000 may become more efficient and less costly.

Optionally, the ring formed by the two magnets 311, 312 fits the shaft 318 circumference. Consequently, the magnets 311, 312 may be conveniently installed on circumference of the shaft 318, for rotation with the shaft 318 and the wheel 315.

Figure 5B:
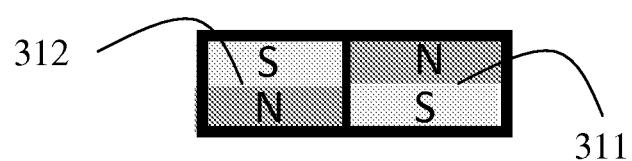
FIG. 5B is a block diagram schematically illustrating an exemplary pair of opposite magnets, in a cross-sectional view, according to an exemplary embodiment of the present invention.

Reference is now made to FIG. 5B, which is a block diagram schematically illustrating an exemplary pair of opposite magnets, in a cross-sectional view, according to an exemplary embodiment of the present invention.

Looking at the ring comprised of the two halves 311, 312, in a cross-sectional view, one half 311 is a magnet with a north magnetic pole up and a south magnetic pole down, whereas the second half 312 of the ring is a magnet with a south magnetic pole up and a north magnetic field down.

Figure 6:
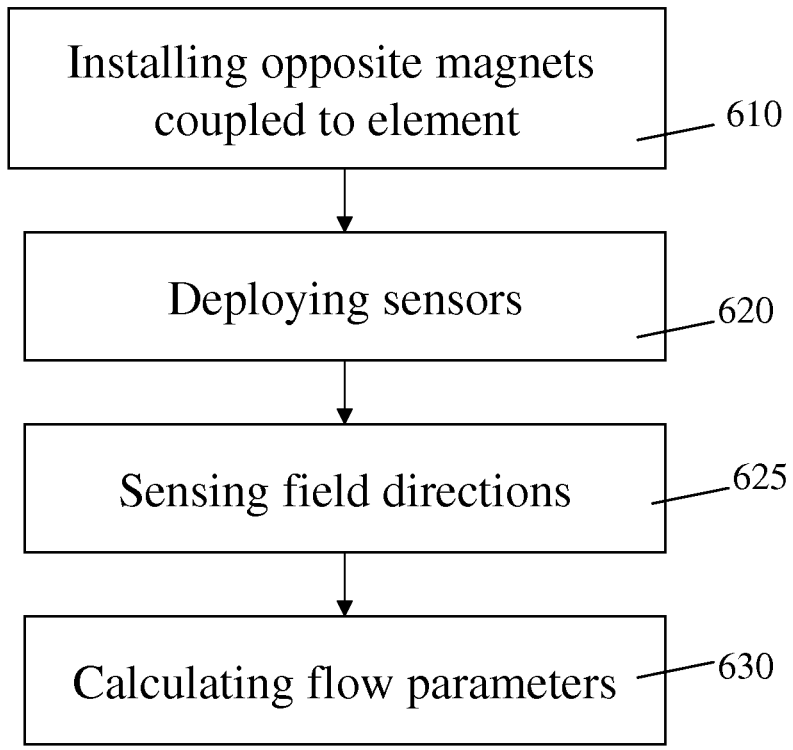
FIG. 6 is a flowchart schematically illustrating a flow metering method, according to an exemplary embodiment of the present invention.

Reference is now made to FIG. 6, which is a flowchart schematically illustrating a flow metering method, according to an exemplary embodiment of the present invention.

In an exemplary method, two or more magnets polarized in opposite (or nearly opposite) directions, are mechanically coupled 610 to a mechanical element.

The mechanical element is mounted in a flow conduit and is movable by a substance flowing through the flow conduit, for imparting movement from the mechanical element to the magnets, as described in further detail hereinabove.

The movement of the mechanical element may be, but is not limited to: a rotational movement, a lateral movement, an irregular movement, etc., as known in the art.

In one example, the magnets are installed 610, mechanically coupled to the mechanical element, in substantially opposite polarization directions, say one magnet with a north pole up and a south pole down, and one magnet with a south pole up and a north pole down.

The magnets may be affixed to the mechanical element using glue, fasteners (say screws), etc., as described in further detail hereinbelow.

The exemplary method further includes a step of deploying 620 two or more magnetic field sensors.

Each of the sensors is deployed in a respective position next to the magnets, say in a distance of 1 to 20 millimeter from the magnets. The sensor senses a direction of a magnetic field in the position, and generates a signal indicative of the direction.

Then, the sensor deployed in each of the positions is used to sense 625 a direction of a magnetic field in the position and generate a signal indicative of the direction.

Optionally, each of the magnetic field sensors generates a first signal upon the magnetic field being a magnetic field of a first direction, with an intensity which is greater than a first threshold. The sensor's signal remains the same (i.e. the generated first signal), until the magnetic field turns into a magnetic field of an opposite direction, with an intensity which is greater than a second threshold, as described in further detail hereinbelow.

In one example, each of the sensors is a Hall-effect digital latch which switches on only when the latch senses a south magnetic field of an intensity greater than a first threshold (as predefined by the latch vendor).

In the example, the switched on Hall-effect digital latch switches off only when the magnetic field turns into a north magnetic field of an intensity greater than a second threshold (as predefined by the latch vendor), as described in further detail hereinbelow. That is to say that the once turned on, the latch remains turned on, until the latch senses a north magnetic field of an intensity greater than the second threshold.

The two thresholds may be the same (only with a magnetic field in opposite direction), as described in further detail hereinbelow.

Optionally, the sensors are distributed in an asymmetric manner over a circle in which the sensors rotate, as described in further detail and illustrated hereinabove, using FIGS. 3A-3B and 4A-4B.

In a first example, there are deployed 620 the two sensors 321, 322, as described in further detail hereinabove, and illustrated using FIG. 3A-3B.

Each one of the sensors 321, 322 is deployed in a respective position over a point in circumference of the circle. The points form an angle of about ninety degrees with an axis of the magnets' rotation, as described in further detail hereinabove.

As the magnets 311, 312 rotate below the sensors 321, 322, the magnetic field sensed by each of the sensors 321, 322 alternates between different magnetic polarity directions, as described in further detail hereinbelow.

In a second example, the magnets 311, 312 also rotate in a circle in a plane below the magnetic field sensors.

However, in the second example, there are installed three sensors 421-423, as described in further detail hereinabove, and illustrated using FIG. 4A-4B.

Each one of the sensors 421-423 is deployed in a respective position over a point in circumference of the circle. Each two adjacent ones of the points form an angle of about sixty degrees with an axis of rotation of the magnets 311, 312, as described in further detail hereinbelow.

Next, there may be calculated 630 a parameter which characterizes the flowing of the substance through the conduit, say using changes in the signals generated by the sensors, as described in further detail hereinbelow. Optionally, the parameter is calculated by the processor 330, as describe in further detail hereinabove.

As the signals generated by the sensors are indicative of the directions of the magnetic fields, the changes in the signals are indicative of changes in direction of the magnetic fields, as described in further detail hereinbelow.

Optionally, the strength and direction of the magnetic field in each of the sensor's positions are sampled in a dynamically adjusted frequency rate.

For example, the processor 330 may control the sensors 321, 322, by dynamically adjusting a frequency rate in which each of the sensors 321, 322 samples the direction and strength of magnetic field in the sensor's 321, 322 position, and re-generate (i.e. update) the signal.

In the example, every two seconds, the processor 330 instructs the sensors 321, 322 to sample the magnetic field. When the velocity of substance flow increases, the processor 330 increases the frequency in which the processor 330 instructs the sensors 321, 322 to sample the magnetic field.

By adjusting the frequency of the sampling, the processor 330 may save electric power consumption by the sensors 321, 322, and extend the sensors' 321, 322 life expectancy, as described in further detail hereinbelow.

The calculated parameter may include, but is not limited to: velocity of flowing of the substance through the conduit, volume of the substance which flows through the conduit, direction of flow of the substance through the conduit, etc., as described in further detail hereinbelow.

In one example, the mechanical element is a wheel (say a rotor with blades), as described in further detail hereinabove. The mechanical element is set in path of the material (say a fluid or a gas) which flows through the flow conduit. As the material flows through the conduit, the material sets the rotor in rotational motion, as known in the art. Consequently, the magnets mechanically coupled to the mechanical element, rotate with the element, as described in further detail hereinabove.

In the example, the magnets are mounted on the mechanical element (say the rotor) and rotate simultaneously with the mechanical element. The direction of the magnetic field sensed by each of the sensors, alternates in concert with rotation of the magnets, as described in further detail hereinbelow.

The mechanical element may also have any of other known in the art forms, usable for generation of movement by a substance, when the substance flows through a flow conduit. The mechanical element may include, but is not limited to any element currently used in mechanical flow meters, such as turbines of various designs, Woltmann meters, pressure-based meters, etc.

Figure 7:
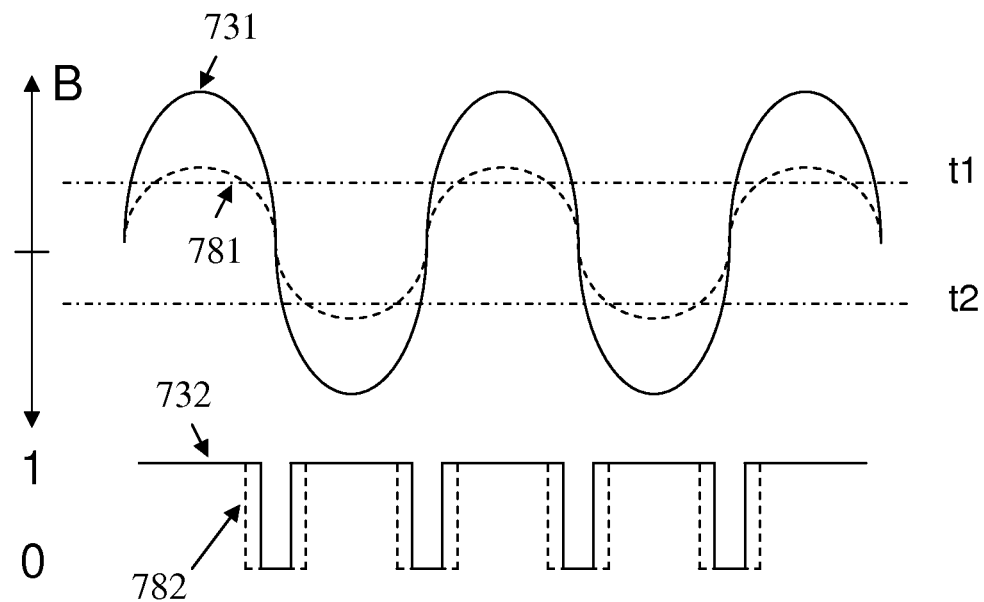
FIG. 7 is a graph illustrating concerted changes in a sensor signal and in a magnetic field, according to an exemplary embodiment of the present invention.
Figure 7:
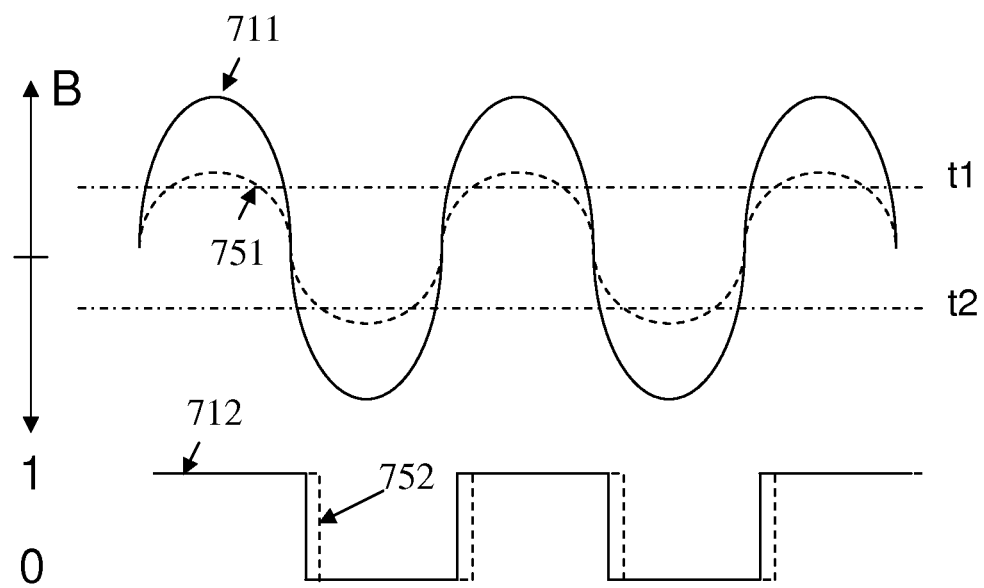

Reference is now made to FIG. 7, which is a graph illustrating concerted changes in a sensor signal and in a magnetic field, according to an exemplary embodiment of the present invention.

An exemplary sinusoidal graph 711 depicts a magnetic field's intensity and direction, in a position of sensor 322 (say the Hall effect latch) deployed over the circle in which the magnets 311, 312 of apparatus 3000 rotate, as described in further detail and illustrated using FIGS. 3A and 3B hereinabove.

Graph 712 depicts the signal generated by the sensor 322. The signal changes simultaneously with the changes in intensity and direction of the magnetic field, as the magnets 311, 312 rotate with the mechanical element 315 of the apparatus 3000.

When the sensor 322 senses a magnetic field in a first direction, with an intensity greater than a first threshold (denoted: t1), say when the magnets align in the position illustrated using FIG. 3B hereinabove, the sensor 322 generates a positive ('1' bit) signal.

The signal remains positive, until the magnetic field is in an opposite direction, with an intensity greater than a second threshold (denoted: t2), as described in further detail hereinbelow, in which point, the sensor 322 generates a negative ('0' bit) signal.

The signal turns positive again only when the magnetic field is back in the first direction and has a magnetic field intensity greater than the first threshold (denoted: t1).

As shown using the graph 712, the changes in the signal through rotation of the magnets 311, 312 take place in fixed or nearly fixed frequency. That is to say that the time interval between interrupts (i.e. changes) in which the signal changes from negative (say a '0' bit) to positive (say a '1' bit) or vice versa, remains the same (or nearly the same).

The frequency remains the same (or nearly the same), even when the magnets 311, 312 are placed in further distance from the sensor 322 (or if the magnets are replaced by weaker magnets), as long as the magnetic fields are strong enough to be sensed by the sensor 322.

For example, an exemplary sinusoidal graph 751 depicts a weak magnetic field's intensity and direction, in a position of the sensor 322 (say the Hall effect latch) deployed over the circle in which the magnets 311, 312 of apparatus 3000 rotate, as described in further detail and illustrated using FIG. 3A hereinabove.

As shown using the graph 752, the changes in the signal through rotation of the magnets 311, 312 take place in the same fixed or nearly fixed frequency, although with a slight time displacement of the graph 752.

With the fixed frequency of signal changes (i.e. interrupts), the sampling of the magnetic field by the sensor 322 may take place in a somewhat relaxed manner (i.e. less frequently). Consequently, there may be saved electric power consumption by the sensor 322 and there may be provided a longer life expectancy for the sensor 322.

Consequently, when the magnets 311, 312 rotate in a circle under the sensors 321, 322, the resultant signal may experience symmetrical sequence of interrupts, with a fifty percent duty cycle, as known in the art.

By contrast, in a different setting, a sensor of a second type generates a positive signal only when the intensity of the magnetic field in any direction (south or north) is stronger than the respective threshold (t1 or t2), and a negative signal in between.

The second type sensor is deployed in a point above a single magnet rotating in circle below the second type sensor.

The signal of the second type sensor changes in a changing frequency. That is to say that the time interval between interrupts (i.e. changes) in which the signal changes from negative (say a '0' bit) to positive (say a '1' bit) and vice versa are different, as illustrated using graphs 731 and 732 hereinbelow.

Sinusoidal graph 731 depicts a magnetic field's intensity and direction, in a position of the second type sensor when the magnet rotates.

Graph 732 depicts the signal generated by the second type sensor, through the rotation of the magnet.

Further to the difference in the time interval between the interrupts, the frequency when using a sensor of the second type is much more dependent on the strength of the signal magnet which rotates below the second type sensor.

For example, graph 782 depicts the signal generated by the second type sensor when the magnet is replaced by a slightly weaker magnet, whereas exemplary sinusoidal graph 781 depicts the changes in the weaker magnets' field as sensed by the second type sensor.

Figure 8:
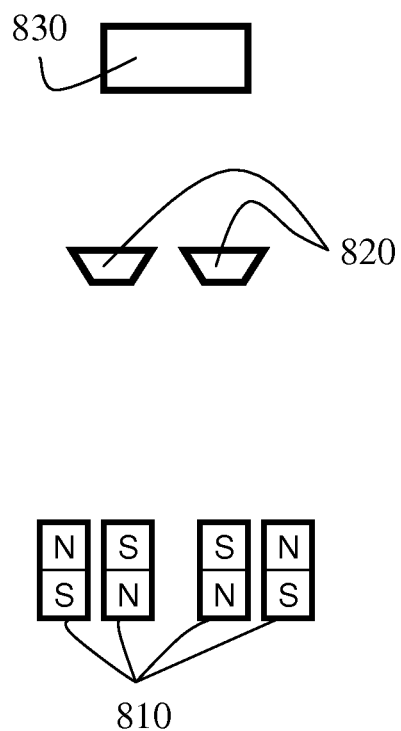
FIG. 8 is a block diagram schematically illustrating a flow meter kit, according to an exemplary embodiment of the present invention.

Reference is now made to FIG. 8, which is a block diagram schematically illustrating a flow meter kit, according to an exemplary embodiment of the present invention.

An exemplary flow meter kit, according to an exemplary embodiment of the present invention, includes a processor 830 (say a processor 830 embedded in an electric circuit), which may be installed in a pipeline, as described in further detail hereinabove.

The processor 830 may communicate with two or more magnetic field sensors and calculate a parameter which characterizes flowing of a substance through a flow conduit, as described in further detail hereinabove.

More specifically, the processor 830 calculates the parameter, using changes in a signal generated by each respective one of the sensors. The signal is indicative of a direction of a magnetic field in position of the sensor, as described in further detail hereinabove.

The calculated parameter may include, but is not limited to: velocity of flowing of the substance through the conduit, volume of the substance which flows through the conduit, direction of flow of the substance through the conduit, etc.

The magnetic field is produced by two or more magnets mechanically coupled to a mechanical element (say a rotor or a turbine) mounted in the flow conduit, in substantially opposite polarization directions, as described in further detail hereinabove.

When a substance flows through the conduit, the substance moves the mechanical element, say by setting the rotor or turbine in rotation, as described in further detail hereinabove.

Optionally, the exemplary flow meter kit further includes the magnets 810, for mechanical coupling to the mechanical element, say using glue or fasteners (say screws).

The magnets 810 need to be coupled to the mechanical element, with the magnets' polarity oriented in substantially opposite directions (say one magnet with a north pole up and another magnet with a south pole up), as described in further detail hereinabove.

Optionally, the exemplary flow meter kit further includes the sensors 820, for deployment in positions next to the magnets, using glue or fasteners (say screws).

The sensors 820 need to be deployed in a predefined spatial relation to the magnets 810, say a relation similar to the one described in further detail hereinabove, using FIGS. 3A and 3B hereinabove.

Optionally, the mechanical element is an element of one of many currently used mechanical metering devices, such as the meters currently used for measurement of water, gas, etc.

The processor 830, as well the magnets 810 and the sensors 820, may be removed from the mechanical metering device, for repair, routine maintenance, replacement, etc.

In one example, the mechanical element is a rotor connected to a rotatable shaft, with rotor vanes extending radially, at an angle of inclination with the rotor's axis (i.e. the shaft), etc., as described in further detail hereinabove.

The rotor is set in path of a material (say a fluid or a gas) which flows through a flow conduit. As the material flows through the conduit, the material impinges on the vanes and imparts a force to the vanes' surfaces, thus setting the rotor in rotational motion, as known in the art. Consequently, the magnets 810 mechanically coupled to the rotor rotate with the rotor, and each of the sensors 820 deployed over the magnets 810, senses a magnetic field which changes as the magnets 810 rotate, as described in further detail hereinabove.

The mechanical element may also have any of other known in the art forms, usable for generation of movement by a material flowing through a flow conduit, as currently used for mechanical flow measurement, such as turbines of various designs, Woltmann meters, pressure-based meters, etc.

Optionally, each of the magnetic field sensors 820 generates a first signal upon the magnetic field being a magnetic field of a first direction, with an intensity which is greater than a first threshold. The sensor's signal remains the same (i.e. the generated first signal), until the magnetic field turns into a magnetic field of an opposite direction, with an intensity which is greater than a second threshold, as described in further detail hereinbelow.

In one example, each of the sensors 820 is a Hall-effect digital latch which switches on only when the latch senses a south magnetic field of an intensity greater than a first threshold (as predefined by the latch vendor).

In the example, the switched on Hall-effect digital latch switches off only when the magnetic field turns into a north magnetic field of an intensity greater than a second threshold (as predefined by the latch vendor), as described in further detail hereinbelow. That is to say that once turned on, the latch remains turned on, until the latch senses a north magnetic field of intensity greater than the second threshold.

The two thresholds may be the same (only with a magnetic field in opposite direction), as described in further detail hereinbelow.

It is expected that during the life of this patent many relevant devices and systems will be developed and the scope of the terms herein, particularly of the terms "Flow Meter", "Magnet", "Permanent magnets", "Magnets of grade N45", "electromagnets", "Sensor", "Hall effect latch", "Processor", "Electric circuit", "digital processing board", "Turbine", "Rotor", and "Mechanical flow meter", is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A flow meter apparatus comprising:
    at least two magnets polarized in substantially opposite directions, mechanically coupled to a mechanical element mounted in a flow conduit and movable by a substance flowing through the flow conduit, for imparting movement from the mechanical element to said magnets; and
    at least two magnetic field sensors, each of said sensors deployed in a respective position next to said magnets and configured to sense direction and intensity of a magnetic field in said position and to generate a first signal upon said sensed direction being a first direction and said sensed intensity being greater than a threshold for intensity in said first direction, and for any direction and intensity sensed by said sensor later, until said later sensed direction is an opposite direction and said later sensed intensity is greater than a threshold for intensity in said opposite direction.

2. The flow meter apparatus of claim 1, further comprising a processor, in communication with said magnetic field sensors, configured to calculate a parameter characterizing the flowing of the substance through the conduit, using changes in said generated signals indicative of said directions.

3. The flow meter apparatus of claim 2, wherein the processor is further configured to control said sensor, for dynamically adjusting a frequency rate in which said sensor samples the magnetic field and re-generates the signal.

4. The flow meter apparatus of claim 2, wherein the calculated parameter characterizing the flowing of the substance through the conduit is a velocity of flowing of the substance through the conduit.

5. The flow meter apparatus of claim 2, wherein the calculated parameter characterizing the flowing of the substance through the conduit is a volume of the substance flowing through the conduit.

6. The flow meter apparatus of claim 2, wherein the calculated parameter characterizing the flowing of the substance through the conduit is a direction of flow of the substance through the conduit.

7. The flow meter apparatus of claim 1,
wherein said sensor is further configured to generate a second signal upon said sensed direction being said opposite direction and said sensed intensity being greater than said threshold for intensity in said opposite direction, and for any direction and intensity sensed by said sensor later, until said later sensed direction is said first direction and said later sensed intensity is greater than said threshold for intensity in said first direction.

8. The flow meter apparatus of claim 1, wherein said magnets rotate in a circle, said magnetic field sensors comprise two sensors, and each one of said sensors is deployed in a respective position over a point in circumference of the circle, the points forming an angle of about 90 degrees with an axis of rotation of said magnets.

9. The flow meter apparatus of claim 1, wherein said magnets rotate in a circle, said magnetic field sensors comprise three sensors, and each one of said sensors is deployed in a respective position over a point in circumference of the circle, each two adjacent ones of the points forming an angle of about 60 degrees with an axis of rotation of said magnets.

10. The flow meter apparatus of claim 1, wherein said magnets rotate in a circle and said magnetic field sensors are distributed asymmetrically over the circle.

11. The flow meter apparatus of claim 1, wherein the mechanical element is a wheel rotatable by said substance flowing through the flow conduit, said magnets rotate simultaneously with the wheel, and said sensed direction of the magnetic field alternates in concert with rotation of said magnets.

12. A method for flow metering, comprising the steps of:
a) installing at least two magnets polarized in substantially opposite directions, mechanically coupled to a mechanical element mounted in a flow conduit and movable by a substance flowing through the flow conduit, for imparting movement from said mechanical element to said magnets;
b) deploying at least two magnetic field sensors, each sensor being deployed in a respective position next to said magnets; and
c) sensing a direction and an intensity of a magnetic field in each of the positions, using the sensor deployed in the position; and generating a first signal upon said sensed direction being a first direction and said sensed intensity being greater than a threshold for intensity in said first direction, and for any direction and intensity sensed using the sensor later, until said later sensed direction is an opposite direction and said later sensed intensity is greater than a threshold for intensity in said opposite direction.

13. The method of claim 12, further comprising a step of calculating a parameter characterizing the flowing of the substance through the conduit, using changes in said sensed directions.

14. The method of claim 12, further comprising generating a second signal upon said sensed direction being said opposite direction and said sensed intensity being greater than said threshold for intensity in said opposite direction, and for any direction and intensity sensed using the sensor later, until said later sensed direction is said first direction and said later sensed intensity is greater than said threshold for intensity in said first direction.

15. The method of claim 12, wherein said magnets rotate in a circle, said magnetic field sensors comprise two sensors, and each one of said sensors is deployed in a respective position over a point in circumference of the circle, the points forming an angle of about 90 degrees with an axis of rotation of said magnets.

16. The method of claim 12, wherein said magnets rotate in a circle, said magnetic field sensors comprise three sensors, and each one of said sensors is deployed in a respective position over a point in circumference of the circle, each two adjacent ones of the points forming an angle of about 60 degrees with an axis of rotation of said magnets.

17. The method of claim 12, wherein said magnets rotate in a circle and said magnetic field sensors are distributed asymmetrically over the circle.

18. A flow meter kit, comprising:
a processor, configured to communicate with at least two magnetic field sensors and calculate a parameter characterizing flowing of a substance through a flow conduit, using changes in a signal generated by each respective one of the sensors, the signal being indicative of a direction and an intensity of a magnetic field in position of the sensor, the signal being a first signal upon said direction being a first direction and said intensity being greater than a threshold for intensity in said first direction, and for any later direction and intensity of the magnetic field, until said later direction is an opposite direction and said later intensity is greater than a threshold for intensity in said opposite direction, the magnetic field being produced by at least two magnets polarized in substantially opposite directions and mechanically coupled to a mechanical element mounted in the flow conduit and movable by the substance flowing through the flow conduit, for imparting movement from the mechanical element to the magnets.

19. The flow meter kit of claim 18, further comprising said magnets, for mechanical coupling to the mechanical element, with polarity in substantially opposite directions.

20. The flow meter kit of claim 18, further comprising said sensors, for deployment in the positions, in a predefined spatial relation to the magnets.

* * * * *